US 7,006,558 B2

(12) United States Patent
Boloorian (10) Patent No.: US 7,006,558 B2
(45) Date of Patent: *Feb. 28, 2006

(54) METHOD AND APPARATUS FOR CORRECTING FREQUENCY OFFSET AND STORAGE MEDIUM STORING CONTROL PROGRAM THEREOF

(75) Inventor: Majid Boloorian, Kirkland, WA (US)

(73) Assignee: NEC Corporation, Tokyo (JP)

( * ) Notice: Subject to any disclaimer, the term of this patent is extended or adjusted under 35 U.S.C. 154(b) by 694 days.

This patent is subject to a terminal disclaimer.

(21) Appl. No.: 09/955,831

(22) Filed: Sep. 19, 2001

(65) Prior Publication Data

US 2002/0054624 A1 May 9, 2002

(30) Foreign Application Priority Data

Sep. 20, 2000 (GB) ................................... 0023117

(51) Int. Cl.
*H04B 1/69* (2006.01)
*H04B 1/707* (2006.01)
*H04B 1/713* (2006.01)

(52) U.S. Cl. ...................... 375/150; 375/130; 375/140; 375/147; 375/365

(58) Field of Classification Search ................ 375/150, 375/365, 130
See application file for complete search history.

(56) References Cited

U.S. PATENT DOCUMENTS 5,276,706 A * 1/1994 Critchlow .................... 375/343
2002/0061054 A1 * 5/2002 Boloorian ................... 375/149

FOREIGN PATENT DOCUMENTS

WO WO 99/66649 12/1999

OTHER PUBLICATIONS

Copy of European Search Report dated Dec. 6, 2002.

* cited by examiner

*Primary Examiner*—Stephen Chin
*Assistant Examiner*—Erin M. File
(74) *Attorney, Agent, or Firm*—Dickstein, Shapiro, Morin &Oshinsky, LLP.

(57) ABSTRACT

The present invention relates to a method and apparatus for correcting frequency offset of a local oscillator in a direct sequence spread spectrum receiver such as Universal Mobile Telecommunications System (UMTS). Received signals comprise a plurality of sequential slots of data. At least one of these includes synchronization data. A correlation is performed between this received data and a locally stored synchronization code. Subsequently, the received data is phase adjusted and a further correlation performed between the phase adjusted data and the locally stored synchronization code. The strongest correlation peak is then determined and a phase offset to be applied to the local oscillator is estimated from the phase adjustment required to produce the strongest peak. This is subsequently applied to the local oscillator.

8 Claims, 6 Drawing Sheets

METHOD AND APPARATUS FOR CORRECTING FREQUENCY OFFSET AND STORAGE MEDIUM STORING CONTROL PROGRAM THEREOF

BACKGROUND OF THE INVENTION

1. Field of the Invention

The present invention relates to a method and apparatus for correcting frequency offset in a direct sequence spread spectrum communication system (DSS) and a storage medium storing a control program therefor, and is particularly applicable to this type of offset correction in a wide band code division multiple access (WCDMA) network such as the proposed universal mobile telecommunications system (UMTS).

The present application claims priority of British Patent Application No. 0023117.5 filed on Sep. 20, 2000, which is hereby incorporated by reference.

2. Description of the Related Art

In cellular communication systems, the timing and frequency accuracy of transmissions from network base stations rely on very stable and highly accurate reference oscillators. As there are a fixed and relatively small number of network base stations in a system such as UMTS, or any other mobile phone system, the reference oscillators and the network base stations can be relatively expensive and accurate. An accuracy of e.g., 0.05 parts per million (ppm) is typical and more accurate oscillators are available. In such systems, however, there are typically far more mobile stations which communicate with the network base stations. In a system such as UMTS, these are mobile telephones which have to be sold at a competitive market price and therefore costs have to be minimized. Therefore, low cost reference oscillators such as voltage control crystal oscillators (VCXO) would usually be selected for the reference oscillators of mobile stations. The frequency accuracy of these low cost reference oscillators is relatively low, e.g., 5 ppm.

Because the accuracy of the mobile oscillators Is much less than that available to the base stations with their more accurate reference oscillators, significant problems can occur with synchronization between the base station transmission and the locally generated carrier frequency used for down conversion.

SUMMARY OF THE INVENTION

In view of the above, it is an object of the present invention to provide a method and apparatus for correcting frequency offset in a direct sequence spread spectrum communication system and a storage medium storing a control program therefor.

According to a first aspect of the present invention, there is provided a method for correcting frequency offset of a local oscillator in a direct sequence spread spectrum receiver wherein received signals include a plurality of sequential slots of data, at least one of which includes synchronization data, the method including the steps of performing a first correlation between the received data and a locally stored synchronization code, adjusting the phase of the received data by a predetermined phase step, performing a second correlation between the phase adjusted data and the stored synchronization code, determining which of the first and second correlations gives the largest correlation peak, storing a signal corresponding to the largest correlation peak, estimating the phase offset to be applied to the local oscillator from the signal and applying the estimated offset to the local oscillator.

In the foregoing, a preferable mode is one wherein further including the steps of repeatedly adjusting the phase of the received data by the same predetermined phase step after storage of the signal corresponding to the largest correlation peak a predetermined number of times before applying The offset to the local oscillator.

Also, a preferable mode is one wherein further including the step of repeatedly adjusting the phase of the received data in the event that each adjustment of the phase results in an improvement in the largest correlation peak.

According to a second aspect of the present invention, there is provided an apparatus for correcting frequency offset of a local oscillator in a direct sequence spread spectrum receiver wherein received signals include a plurality of sequential slots of data, at least one of which includes synchronization data, the apparatus including means for performing a first correlation between the received data and a locally stored synchronization code, means for adjusting the phase of the received data by a predetermined phase step, means for performing a second correlation between the phase adjusted data and the stored synchronization code means for determining the largest correlation peak in each of the first and second correlations, means for storing a signal corresponding to the largest correlation peak, means for estimating the phase offset to be applied to the local oscillator from the signal, and means for applying the estimated offset to the local oscillator.

In the foregoing, a preferable mode is one wherein further including means for repeatedly adjusting the phase of the received data by the same predetermined phase step after storage of the signal corresponding to the largest correlation peak a predetermined number of times before applying the offset to the local oscillator.

Also, a preferable mode is one wherein further including means for causing the means for repeatedly adjusting the phase of the received data to repeat all its repetitions in the event that each adjustment of the phase results in an improvement in the largest correlation peak.

According to a third aspect of the present invention, there is provided a storage medium storing a control program to cause a computer to carry out a method for correcting frequency offset of a local oscillator in a direct sequence spread spectrum receiver wherein received signals include a plurality of sequential slots of data, at least one of which includes synchronization data, the method including a step of performing a first correlation between the received data and a locally stored synchronization code, a step of adjusting the phase of the received data by a predetermined phase step, a step of performing a second correlation between the phase adjusted data and the stored synchronization code, a step of determining which of the first and second correlations gives the largest correlation peak, storing a signal corresponding to the largest correlation peak, a step of estimating the phase offset to be applied to the local oscillator from the signal, and a step of applying the estimated offset to the local oscillator.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENTS

Best modes of carrying out the present invention will be described in further detail using various embodiments with reference to the accompanying drawings.

The problems discussed above and the solution provided by embodiments of the invention is described with reference to UMTS. It is, however, not limited to this transmission standard and can be applied to any WCDMA systems.

In UMTS, base stations which transmit and receive signals to mobile stations are asynchronous. Transmissions from the base stations need to be synchronized locally by mobiles which receive them. This is performed in an initial cell search when a mobile unit has power applied to it.

UMTS transmission comprises a sequence of frames. Each of these has, e.g., 15 slots and contained within each of these is information dependent on the data rate to be used. Each slot contains a number of symbols where each symbol comprises 2 bits. These 2 bits can be used to transmit 4 possible states using quadrature phase shift keying. Thus, a 10-symbol slot comprises 20 bits.

Figure 2:
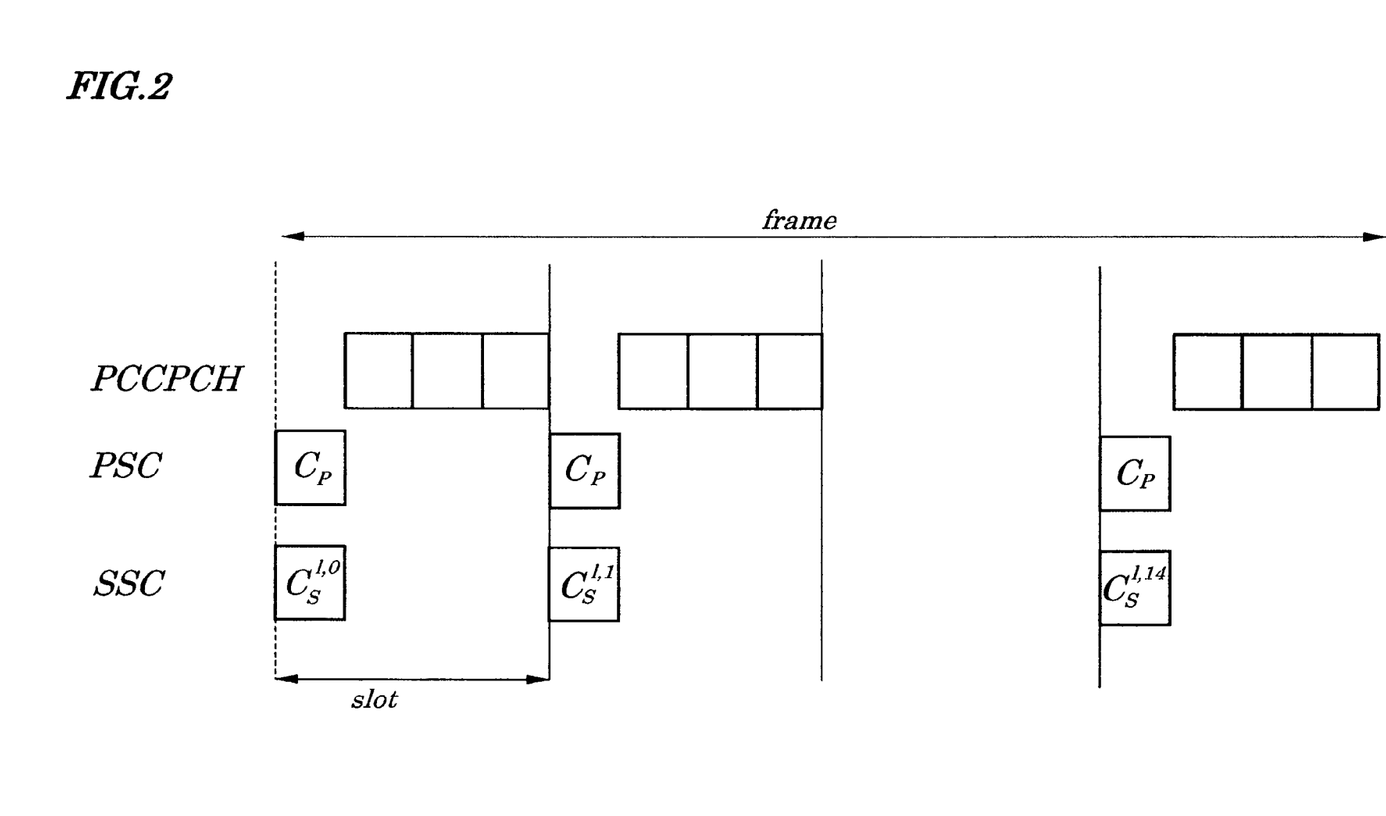
FIG. 2 illustrates the composition of base station synchronization related transmissions.

Base station transmissions include a synchronization channel (SCH) which is aligned with a slot boundary and a primary common control physical channel (PCCPCH). The synchronization channel comprises a primary synchronization code (PSC) and a secondary synchronization code (SSC) as illustrated in FIG. 2. These are used in the initial cell search.

Figure 1:
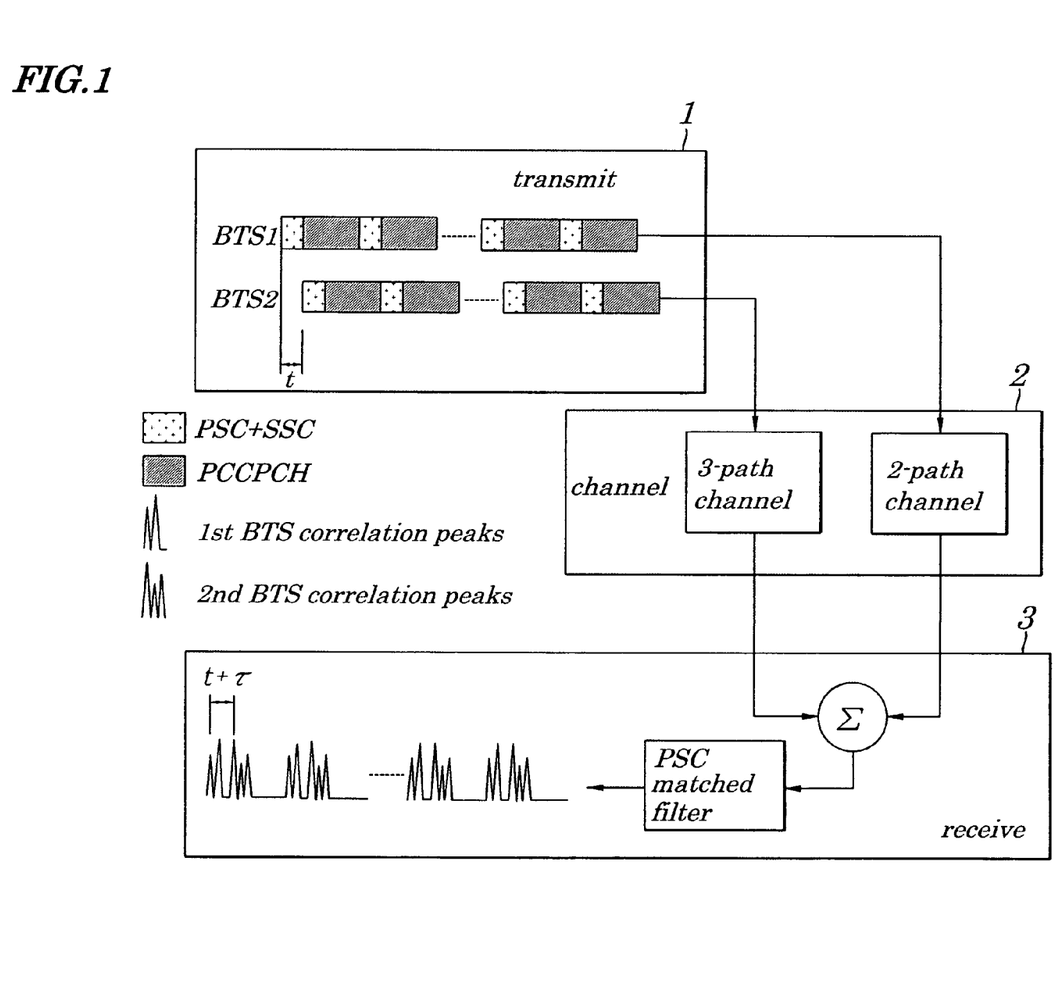
FIG. 1 is a schematic illustration of base station transmissions to a receiver.

Initial cell search by a mobile station is performed in three steps. The first of these is the acquisition of slot synchronization to the transmissions of the base station providing the strongest signal at the receiver of a mobile station. FIG. 1 illustrates schematically base station broadcast transmissions which are represented at 1, a transmission channel at 2, and a mobile station receiver at 3. In this example, transmissions from two base stations (BTS1 and BTS2) are shown.

The base station transmissions are not synchronized with each other and transmit frames comprising slots and symbols as described above. The time Intervals for slots and frames are fixed.

In FIG. 1, the start of a slot -for the transmissions from BTS2 is shown to be delayed from the start of a slot for transmissions from BTS1 by an arbitrary amount t seconds.

The transmissions from the base stations BTS1 and BTS2 to the receiver 3 will be affected by channel 2. Transmissions from BTS2 are illustrated as being received through a 3-path (multipath) channel while the transmissions of BTS1 are illustrated as being received through a 2-path channel. The effect of the channel 2 is to pass the signals from BTS1 and BTS2 to the receiver 3 where they are summed. Correlation of the received signal by the mobile receiver with the expected primary synchronization code stored in the receiver then provides a number of correlation peaks. The highest peak detected corresponds to the base station of the network to which the receiver will synchronize.

Correlation is performed on one slot and the results are held in a buffer. The results for a number of slots are added in. Noise and interference should be -educed and correlation will be the peak if any are detected.

The second step of the initial cell search establishes frame synchronization and identifies the code group of the base station found in step 1. The third step of the initial cell search determines the scrambling code assigned to the found base station. Further details of these second and third steps are not pertinent to the present invention and are therefore not discussed further here but will be known to those skilled in the art.

In down conversion at a mobile receiver the exact frequency to which the received signal is down converted may not be exactly the same as that at the transmitter because of inaccuracies in the local oscillator which arises because, as discussed above, it is lower in cost than that used at the base station. If there is a frequency offset, then the height of correlation peak will be reduced. If the offset is significant then the correlation peak may get buried in the noise and interference therefore making it impossible to synchronize to the slot boundaries.

The inaccuracy in the local oscillator is one possible cause of this frequency offset and preferred embodiments of the present invention seek to correct for this.

Preferred embodiments of the invention provide a method and apparatus for correcting the frequency offset during initial cell search in a direct sequence spread spectrum communications receiver. Received signals comprise a plurality of sequential sets of data, at least one of these including synchrorization data. A correlation is performed between this received data and a locally stored synchronization code. Subsequently, the receivea data is phase adjusted and a further correlation performed between The phase adjusted data and the locally stored code. The strongest correlation peak is then determined and a phase offset for the local oscillator estimated and applied to that oscillator.

The implementation of the invention described herein is applicable to the initial cell search performed at a mobile station operating in frequency division duplex (FDD) mode in a UMTS network. The performance of the UMTS cell search can he degraded by offsets in the carrier and sampling clock frequencies. In practice, both the carrier and sampling clock frequencies are derived from the frequency of a reference oscillator (usually a VCXO). The carrier ($f_c$) and the sampling clock frequencies ($F_{smp}$) may be expressed as in equations (1) and (2) respectively. The terms $k_1$ and $k_2$ in these equations represent constants and $f_x$ is the reference frequency supplied by the reference oscillator of the mobile station.

$$f_c = k_1 \times f_x \qquad (1)$$

$$f_{smp} = k_2 \times f_x \qquad (2)$$

Equations (1) and (2) indicate the ways in which inaccuracies in the reference frequency generated by the crystal oscillator translate into the inaccuracies in the carrier and sampling clock frequencies. When expressed in parts per million, the same inaccuracy will apply to each of the three frequencies, $f_x$, $f_c$, and $f_{smp}$. For example, for a desired carrier frequency of 2 GHz, and a sampling clock frequency of 15.36 MHz, an inaccuracy of 1 ppm (in $f_x$) represents offsets of 2 kHz in the carrier frequency and 15.36 Hz in the sampling frequency.

With regard to WCDMA cell search, the carrier frequency offset results in a continuous phase variation of the received complex signal. The sampling clock frequency offset may cause incorrect detection of vital system timing instances. Any effects of an offset in the sampling clock frequency are observed only after processing of the signals in a large number of slots. The phase rotation caused by the offsets in the carrier frequency results in a decrease in the received ratio of the signal power to the noise plus interference power and as a consequence, an increase in the probability of instances of false detection of timing. Therefore, offsets in both the carrier frequency and the sampling clock frequency will result in a degradation of the performance in all three steps of the UMTS cell search process.

The loss of performance in the cell search caused by the frequency inaccuracies is evident during the first step of the cell search process. Sampling clock offsets may cause errors in detection of the slot boundaries i.e., the slot boundaries will be positioned in he wrong places. If the error in locating the slot boundaries is larger than one chip period, the results obtained by the remaining cell search steps will also be in error. For practical frequency inaccuracies, however, a slippage of 1 chip caused by the sampling clock inaccuracies is observed over long time intervals.

Consequently, the inaccuracies of the sampling clock are of secondary importance when compared to the offsets in the carrier frequency. As the effects of an offset in the carrier frequency are observable immediately, these effects can be measured and used to correct the reference frequency. A reduction in the inaccuracy of the reference frequency will reduce the offsets in both the carrier and sampling clock frequencies also. The method described herein is based on the differential phase offsets imparted to the received primary synchronization code at down-conversion by errors in the local oscillator frequency used for down-conversion. The resulting measurements of phase offset are used to correct the reference oscillator frequency.

A complex baseband signal transmitted by a base station may be represented as $$S_t = A(t)e^{j\theta(t)},$$

where A(t) and θ (t) represent the magnitude and phase respectively of the signal. The transmitted signal when received via a fading path can be represented as:

$$S_r = \beta(t) S_t e^{j(\Delta\Omega t + \phi(t) + \sigma(t))} \quad (3)$$

where ΔΩ is the carrier frequency offset in radians per second, φ(t) is the random phase (in radians) due to the Doppler shift and σ(t) is the random phase due to noise and interference. Variations of the signal envelope are represented as β(t).

In the first step of the UMTS cell search, the in phase (I) and quadrature (Q) components of the received signal are correlated with the primary synchronization code. When the local primary synchronization code is aligned with the first symbol of a received PCCPCH+SCH time-slot (i.e.) at the slot boundary), the transmitted signal may be expressed as:

$$S_t = M e^{j\frac{\pi}{4}} \quad (4)$$

where M is a constant. The correlation of the corresponding received signal with the local primary synchronization code stored in the receiver is shown in equation (5), where T Is the correlation period.

$$C = \int_0^T [\beta(t) M^2 e^{j\frac{\pi}{4}} e^{j(\Delta\omega t + \phi(t) + \sigma(t))}] dt \quad (5)$$

Equation (5) represents the correlation between the local primary synchronization code and the received signal at the slot boundaries. As the primary synchronization code is a known signal, the carrier frequency offset may be estimated by measuring the change in the phase of the received primary synchronization code. Ignoring the effect of Doppler and noise plus interference for simplicity equation 5 may be reduced to $$C = \int_0^T M^2 e^{j\frac{\pi}{4}} e^{j(\Delta\omega t)} dt \quad (6)$$

The correlation peak is then found by finding the power of the above integral. When the received and locally generated PSC's are aligned we can put $M^2=1$ and then the following relationship express the correlation power:

$$|C|^2 \propto \left[ T \times \frac{\sin\left(\frac{\Delta\omega \cdot T}{2}\right)}{\frac{\Delta\omega \cdot T}{2}} \right]^2 \quad (7)$$

Figure 3:
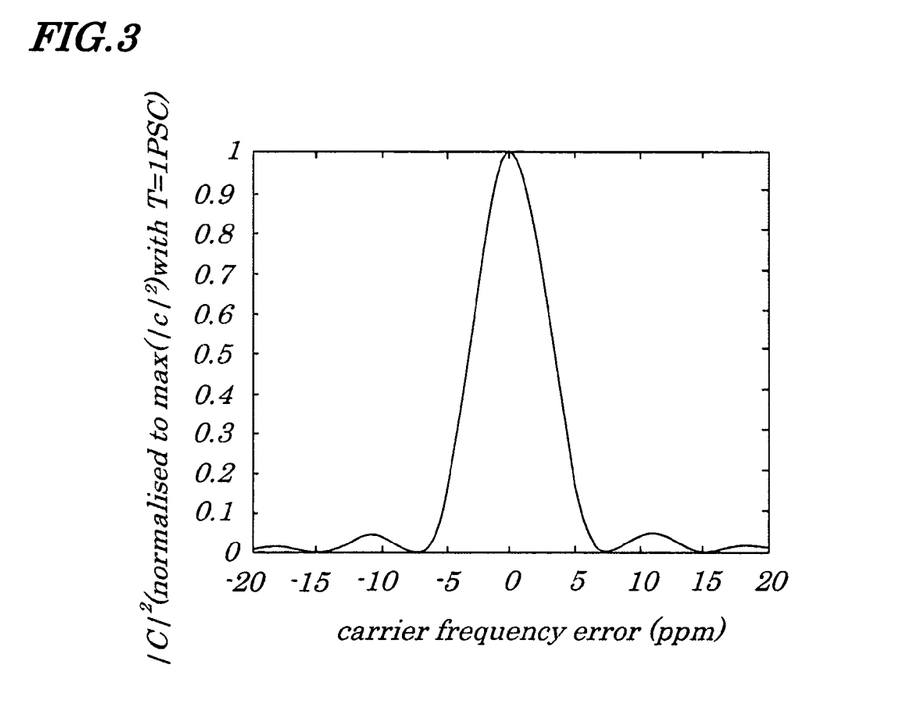
FIG. 3 is a plot of normalized correlation power versus frequency offset.

The graphical plot of FIG. 3 is derived from equation 7 and shows the value of correlation power versus the carrier frequency offset (in ppm) for correlation periods of 1 PSC (256 chips in FDD mode of UMTS).

Figure 4:
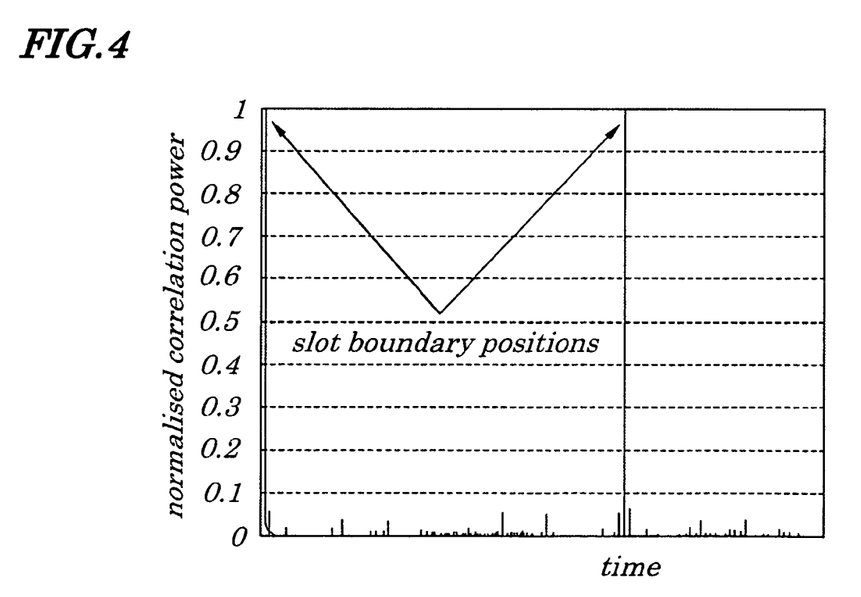
FIG. 4 illustrates the result of a full correlation with no frequency offset.
Figure 5:
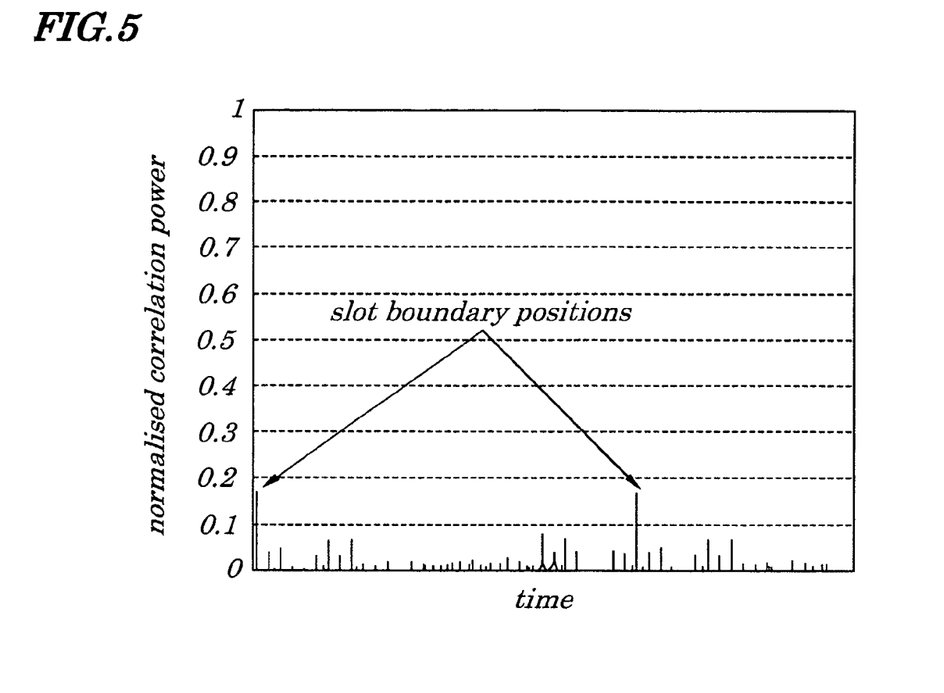
FIG. 5 shows the results from a full correlation at a frequency offset of 5 ppm.
Figure 6:
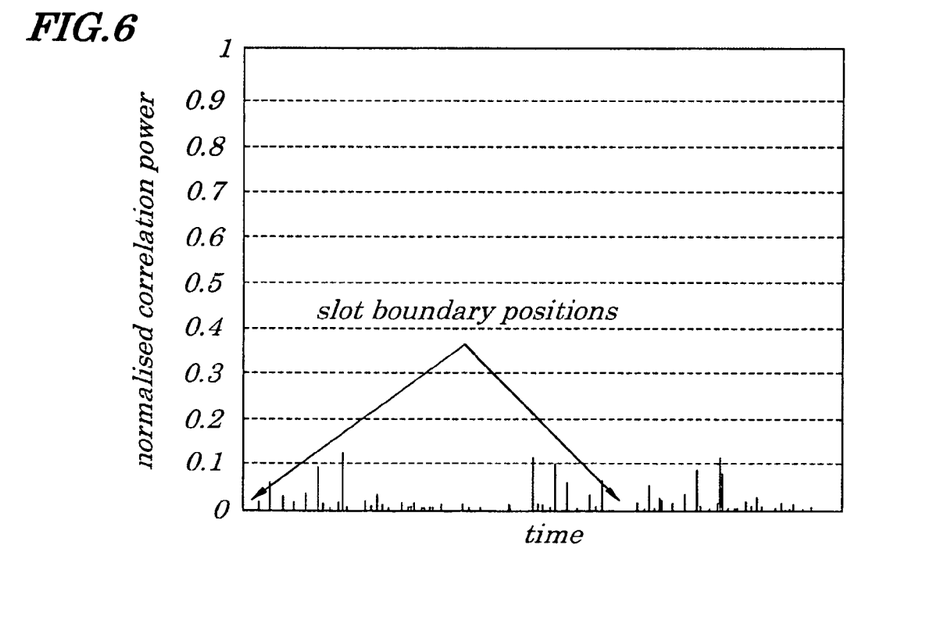
FIG. 6 shows the results from a full correlation at a frequency offset of 7.5 ppm.

FIG. 4 illustrates the result of a full correlation with no frequency offset, FIG. 5 shows the results from a full correlation at a frequency offset of 5 ppm, and FIG. 6 shows the results from a full correlation at a frequency offset of 7.5 ppm.

As discussed above, the size of carrier frequency offset may be estimated by detecting its effect on the correlation between the received PSC signal and a local PSC at the mobile receiver. The larger values of the carrier frequency offset correspond to smaller values of correlation power. The correlation process can then therefore be applied per slot of the received signal and may be averaged to provide a set of average correlation powers by processing a number of received slots. The largest average power will correspond to the largest (average) peak. This will be selected and saved as a reference for the position of a slot boundary.

In order to determine the offset from the local oscillator at the base station, the phase of a received and down converted signal is then altered by $\Delta\Omega_z t$ where $\Delta\Omega_z$ is a frequency shift from a set of predetermined values and t represents time.

The correlation process with the local PSC is then performed again for the same received data with the phase shifted input signal and the average power of the best correlation peak evaluated. The process is repeated for all available frequency shifts and the best correlation powers of each case are compared with each other and the reference. The highest correlation power is used to replace the reference and the corresponding frequency shift is added to an accumulator. The phase shifting process ends if the phase shifted received signal does not generate a correlation power better than reference correlation power. Thus, the phase shifts are applied one at a time until the result of the most recently applied phase shift results in a degradation of the correlation power in comparison to the reference correlation power.

The phase shifts may be added a repeated number of times on the same received data in an Iterative fashion in search of a better estimate to the carrier frequency offset. A final accumulated phase shift store will then hold an estimate of the offset which can be used to correct the reference oscillator frequency.

Figure 7:
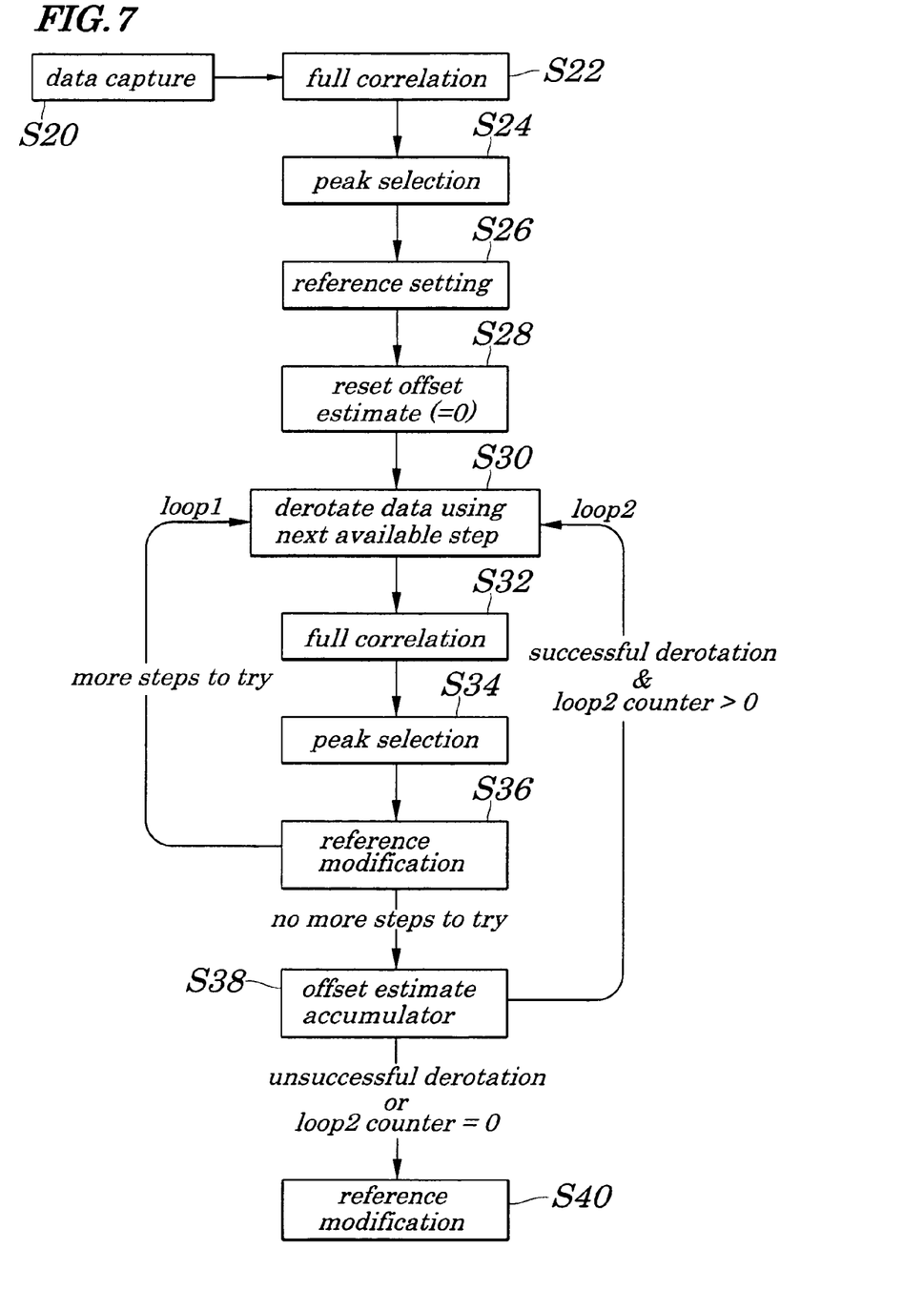
FIG. 7 is a flowchart showing how the process embodying the invention operator.

A flow diagram showing how this process of iterative phase adjustment takes place is shown in FIG. 7. In this, sample data is supplied by a data capture in step S20 and passed to a full correlation step S22 (over 256 chips). From this, data passes to a peak selection step S24 which searches for the highest peak in the correlation and supplies this to a reference setting step S26 which stores the position and power of the highest peak. In the next step S28 and an offset estimate accumulator is set to 0.

The sequence then enters its iterative phase. In this, the original data from the date capture step S20 is phase shifted with a first phase shift step. A full correlation is then performed on it in step S32 with the stored PSC and the highest power peak selected at peak selection step S34. This is then passed to a reference modification step S36 which will modify the reference stored in step S26 if the latest peak selection is higher in value than the stored peak. If there are further frequency steps to apply then the process returns to step S30 where the next available frequency step is applied to the data at correlation and peak selection performed and possible reference modification also performed.

When all the frequency steps have been applied, the process passes to an offset estimate accumulator which stores the phase shift required to derive the currently stored reference peak. If this is different to the original reference peak then the process returns to step S30 and a further sequence of phase shifts are applied to determine whether or not a further improvement in the offset can be achieved. If no improvement is derived or if this second loop has cycled through a predetermined number of times so that its loop counter is reduced to 0 then the contents of the offset estimate accumulator will be applied as a phase shift to the reference oscillator.

The phase shifts supplied iteratively by the process may all be equal in size. Alternatively, the process could arrange to apply repeatedly the same phase shift until the highest average power selected shows no improvement. The last phase shift could then be removed and a smaller phase shift applied. This process would continue with a predetermined number of phase shifts decreasing in size.

Figure 8:
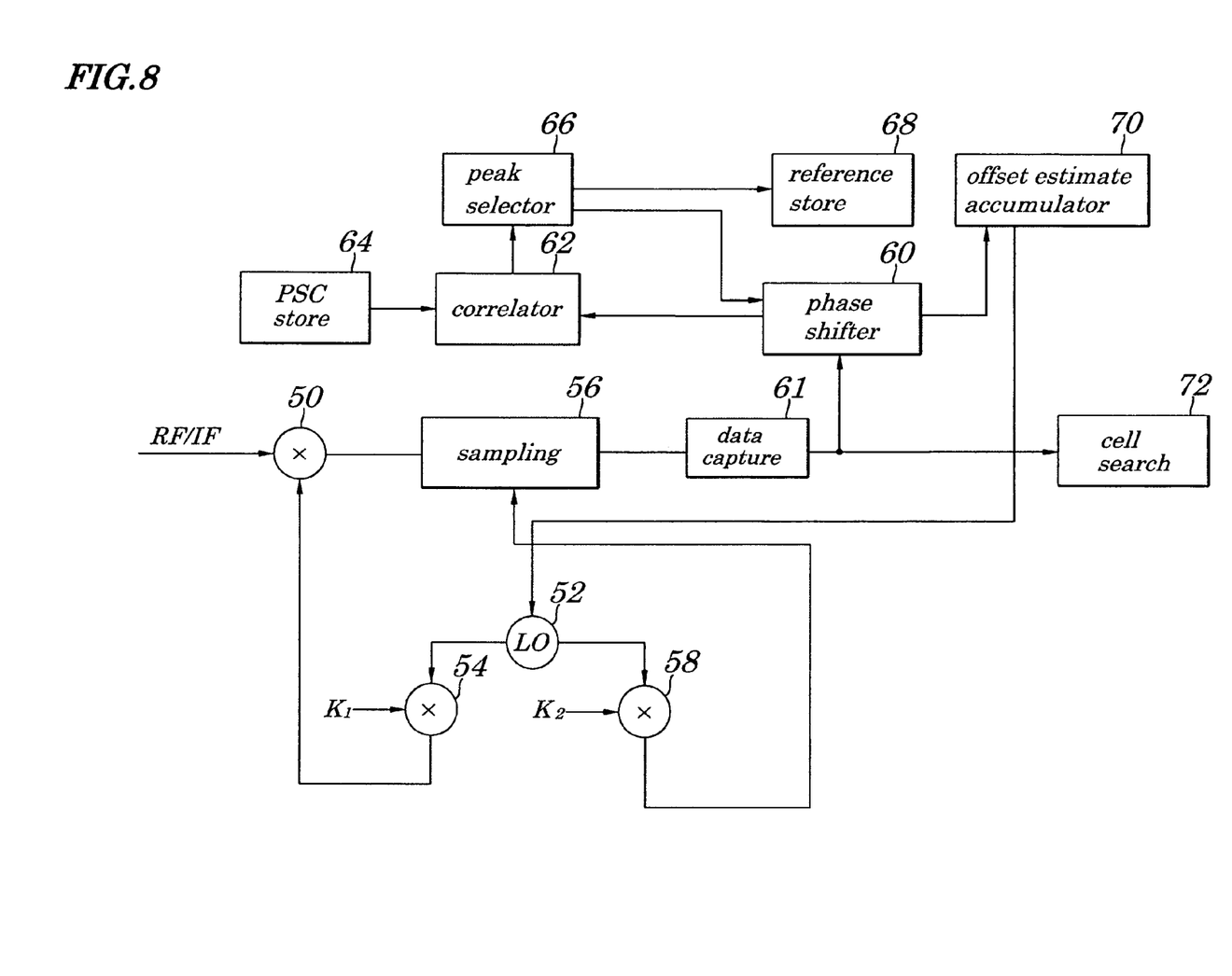
FIG. 8 shows a block diagram of apparatus embodying the invention.

A block diagram of an embodiment of the invention is shown in FIG. 8. In this, input RF/IF data is down converted in a down converter 50 with the frequency from a local oscillator 52 modified by a constant $K_1$ in a multiplier 54. The down converted data passes to a sampling unit 56 which is controlled by a sampling frequency supplied also from the local oscillator 52 by multiplication of its frequency in a multiplier 58 by a constant $K_2$.

The sampled data is supplied to a phase shifter 60 via a data capture unit 61 which initially applies zero phase shift to the data before supplying it to a correlator 62 which correlates it with data stored in the primary synchronization code store 64. The result of this correlation is passed to a peak selector which looks for the peak with the highest power and stores this in a reference store 68. Selection of the peak sends a control signal to the phase shifter 60 to cause it to shift the data which it previously supplied to the correlator 62 by a predetermined step and for the correlation and peak selection performed by correlator 62 and peak selector 66 to be performed again.

If the peak selected from the latest correlation is larger than that stored in the reference store 68 then the contents of that store are replaced. The phase shifter is then controlled to apply a further phase shift to the data and for the process to repeat. This will continue a predetermined number of times until a loop counter has decremented to 0, at which stage the applied phase shift will be applied to an offset estimate accumulator 70.

If each phase shift applied results in an improvement in the power of the largest peak from correlation then the whole process is repeated again with a further set of phase shifts applied by phase shifts applied phase shifter 60. This whole process can repeat as often as desired by having a counter to count the number of times that the complete set of phase shifts are applied. After each complete set have been applied, the current phase shift is added into the offset estimate accumulator 70, if the position of the peak indicator phase shift is resulting in an improvement in the largest peak power.

Once all loops have been completed, the offset phase estimate from the offset accumulator is applied to the local oscillator 52 such that it will subsequently be used by the down converter 50 and sampling unit 56 and the process can then proceed to cell search in unit 72.

It is noted that a mobile receiver as described in the above embodiments has a processor (not shown) to control each of components of the mobile receiver in accordance with a specified control program, a ROM (not shown) used to store the specified control program executed by the processor, a RAM (not shown) serving as a working area of the processor or the like.

It is apparent that the present invention is not limited to the above embodiments but may be changed and modified without departing from the scope and spirit of the invention.

What is claimed is:

1. A method for correcting frequency offset of a local oscillator in a direct sequence spread spectrum receiver wherein received signals include a plurality of sequential slots of data, at least one of which includes synchronization data, said method comprising the steps of:
performing a first correlation between said received data and a locally stored synchronization code;
adjusting the phase of said received data by a predetermined phase step;
performing a second correlation between said phase adjusted data and said stored synchronization code;
determining which of said first and second correlations gives the largest correlation peak;
storing a signal corresponding to said largest correlation peak;
estimating the phase offset to be applied to said local oscillator from said signal; and
applying said estimated offset to said local oscillator.

2. The method according to claim 1 further comprising the step of repeatedly adjusting the phase of said received data by the same predetermined phase step after storage of said signal corresponding to said largest correlation peak a predetermined number of times before applying said offset to said local oscillator.

3. The method according to claim 2 further comprising the step of repeating said adjusting step in the event that each adjustment of the phase results in an improvement in said largest correlation peak.

4. An apparatus for correcting frequency offset of a local oscillator in a direct sequence spread spectrum receiver wherein received signals include a plurality of sequential slots of data, at least one of which includes synchronization data, said apparatus comprising:
- means for performing a first correlation between said received data and a locally stored synchronization code;
- means for adjusting the phase of said received data by a predetermined phase step;
- means for performing a second correlation between said phase adjusted data and said stored synchronization code;
- means for determining the largest correlation peak in each of said first and second correlations;
- means for storing a signal corresponding to said largest correlation peak;
- means for estimating the phase offset to be applied to said local oscillator from said signal; and
- means for applying said estimated offset to said local oscillator.

5. The apparatus according to claim 4 further comprising means for repeatedly adjusting the phase of said received data by the same predetermined phase step after storage of said signal corresponding to said largest correlation peak a predetermined number of times before applying said offset to said local oscillator.

6. The apparatus according to claim 5 further comprising means for causing said means for repeatedly adjusting the phase of said received data to repeat all its repetitions in the event that each adjustment of the phase results in an improvement in said largest correlation peak.

7. The apparatus according to claim 6 wherein said direct sequence spread spectrum receiver includes at least a telephone and a mobile telephone.

8. A storage medium storing a control program to cause a computer to carry out a method for correcting frequency offset of a local oscillator in a direct sequence spread spectrum receiver wherein received signals include a plurality of sequential slots of data, at least one of which includes synchronization data, said method comprising the steps of:
- performing a first correlation between said received data and a locally stored synchronization code;
- adjusting the phase of said received data by a predetermined phase step;
- performing a second correlation between said phase adjusted data and said stored synchronization code;
- determining which of said first and second correlations gives the largest correlation peak;
- storing a signal corresponding to said largest correlation peak;
- estimating the phase offset to be applied to said local oscillator from said signal; and
- applying said estimated offset to said local oscillator.

* * * * *